(12) United States Patent
McIntyre

(10) Patent No.: US 8,527,233 B2
(45) Date of Patent: Sep. 3, 2013

(54) AIRSPEED SENSING SYSTEM FOR AN AIRCRAFT

(75) Inventor: Melville Duncan Walter McIntyre, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 12/891,291

(22) Filed: Sep. 27, 2010

(65) Prior Publication Data

US 2012/0078540 A1 Mar. 29, 2012

(51) Int. Cl.
*G01P 5/14* (2006.01)

(52) U.S. Cl.
USPC ............... 702/144; 702/50; 702/96; 702/98; 701/6; 701/7

(58) Field of Classification Search
USPC ............... 702/50, 92, 96, 98, 142, 143, 144; 701/6, 7
See application file for complete search history.

(56) References Cited

U.S. PATENT DOCUMENTS

| 3,795,145 | A | * | 3/1974 | Miller | 73/861.53 |
| 6,101,429 | A | * | 8/2000 | Sarma et al. | 701/7 |
| 8,095,251 | B2 | | 1/2012 | Preaux | |
| 2009/0222150 | A1 | | 9/2009 | Preaux | |
| 2010/0100260 | A1 | | 4/2010 | Mcintyre et al. | |
| 2010/0185343 | A1 | | 7/2010 | Broquet et al. | |

FOREIGN PATENT DOCUMENTS

EP  1391736 A1  2/2004

OTHER PUBLICATIONS

EP search report 11179827.8/2434296 dated Jul. 5, 2012, regarding reference P52694EP/RGBH, applicant The Boeing Company, 7 Pages..
Yeh "Triple-Triple Redundant 777 Primary Flight Computer," IEEE Aerospace Applications Conference Proceedings, vol. 1, Feb. 1996, pp. 293-307.

* cited by examiner

*Primary Examiner* — Alexander H Taningco
*Assistant Examiner* — Paul D Lee
(74) *Attorney, Agent, or Firm* — Yee & Associates, P.C.

(57) ABSTRACT

The different advantageous embodiments provide an apparatus and method for identifying an airspeed for an aircraft. In one advantageous embodiment, an apparatus is provided. The apparatus consists of a plurality of pitot-static probes. The plurality of pitot-static probes generate a first data. The apparatus also consists of a plurality of angle of attack sensor systems. The plurality of angle of attack sensor systems generate a second data. The apparatus also consists of a plurality of light detection and ranging sensors. The light detection and ranging sensors generates a third data. The apparatus also consists of a signal consolidation system configured to detect errors in the first data generated by the plurality of pitot-static probes, the second data generated by the plurality of angle of attack sensor systems, and the third data generated by the plurality of light detection and ranging sensors.

16 Claims, 5 Drawing Sheets

| SENSOR | $P_T$ |
|---|---|
| 606 — PITOT STATIC 1 | 26 |
| 606 — PITOT STATIC 2 | 23 |
| 608 — ANGLE OF ATTACK 1 | 24 |
| 608 — ANGLE OF ATTACK 2 | 22 |
| 610 — VENTURI TUBES 1 | 14 |
| 610 — VENTURI TUBES 2 | 11 |

| SENSOR | $P_T$ |
|---|---|
| 702 — PITOT STATIC | 24 |
| 704 — ANGLE OF ATTACK | 24 |
| 706 — VENTURI TUBES | 14 |

AIRSPEED SENSING SYSTEM FOR AN AIRCRAFT

BACKGROUND INFORMATION

1. Field

The present disclosure relates generally to sensor systems and more specifically to airspeed sensor systems.

2. Background

Sensor systems for aircraft provide flight data to pilots. These sensor systems provide data such as altitude, airspeed, heading, and pitch to pilots to enable them to operate the aircraft. For example, pilots may use heading data to determine when the aircraft is traveling in the direction of the destination of the aircraft.

The sensor systems are also used by computer systems that control systems onboard the aircraft. For example, airspeed may be used by computer systems onboard the aircraft to control the speed and stability of the aircraft.

True airspeed is the actual speed of an aircraft relative to the air in which the aircraft is flying. Calibrated airspeed is the speed of the aircraft as identified by sensor systems onboard the aircraft. Calibrated airspeed differs from true airspeed in that calibrated airspeed is uncorrected for the effects of the compressibility and density of the air surrounding the aircraft at the time of measurement. As used herein, calibrated airspeed is referred to as airspeed.

Airspeed is an example of a measurement made by a sensor system for an aircraft. Different types of sensors may be used in the sensor system used to measure airspeed. For example, a pitot-static tube may be used to measure airspeed. A pitot-static tube measures airspeed by identifying the total and static pressures in the environment surrounding the aircraft.

Different conditions may change the accuracy with which a sensor measures airspeed. For example, ice may accumulate in or around an airspeed sensor. The ice may cause the airspeed sensors to report an airspeed for the aircraft that is less accurate than desired.

With a decreased accuracy in detecting the airspeed of an aircraft, the data reported by the sensor systems to a pilot and/or onboard computer systems by the sensor system may reduce the performance of the aircraft. For example, airspeed and other information may be used to maintain the aircraft speed at an acceptable value. If the airspeed is not as accurate as desired, control of the airplane may become compromised.

Accordingly, it would be advantageous to have a method and apparatus which takes into account one or more of the issues discussed above, as well as possibly other issues.

SUMMARY

The different advantageous embodiments provide an apparatus and method for identifying an airspeed for an aircraft. In one advantageous embodiment, an apparatus is provided. The apparatus consists of a plurality of pitot-static probes. Each of the plurality of pitot-static probes is a first sensor type. The plurality of pitot-static probes generate a first data. The apparatus also consists of a plurality of angle of attack sensor systems. Each of the plurality of angle of attack sensor systems is a second sensor type, and the plurality of angle of attack sensor systems generates a second data. The apparatus also consists of a plurality of light detection and ranging sensors. Each of the plurality of light detection and ranging sensor systems is a third sensor type, and the plurality of light detection and ranging sensor systems generates a third data. The apparatus also consists of signal consolidation system configured to detect errors in the first data generated by the plurality of pitot-static probes, the second data generated by the plurality of angle of attack sensor systems, and the third data generated by the plurality of light detection and ranging sensors.

In another advantageous embodiment, an apparatus consists of a plurality of pitot-static probes, a plurality of angle of attack sensor systems, a plurality of Venturi tubes, and a signal consolidation system. Each of the plurality of pitot-static probes is a first sensor type. The plurality of pitot-static probes is configured to generate first data. Each of the plurality of angle of attack sensor systems is a second sensor type, and the plurality of angle of attack sensor systems is configured to generate second data. Each of the plurality of Venturi tubes is a third sensor type, and the plurality of Venturi tubes is configured to generate third data. The signal consolidation system is configured to detect errors in the first data generated by the plurality of pitot-static probes, the second data generated by the plurality of angle of attack sensor systems, and the third data generated by the plurality of Venturi tubes.

In yet another advantageous embodiment, a method for identifying an airspeed of an aircraft is provided. A plurality of pitot-static probes generates a first total pressure value and a first static pressure value for an environment surrounding the aircraft. A plurality of light detection and ranging sensors generates a second total pressure value and a second static pressure value for the environment surrounding the aircraft. A plurality of angle of attack sensor systems generate a third total pressure value and a third static pressure value for the environment surrounding the aircraft. Errors in the first total pressure value, the first static pressure value, the second total pressure value, the second static pressure value, the third total pressure value, and the third static pressure value are consolidated to form a consolidated total pressure value and a consolidated static pressure value. An airspeed is identified for the aircraft from the consolidated total pressure value and the consolidated static pressure value.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
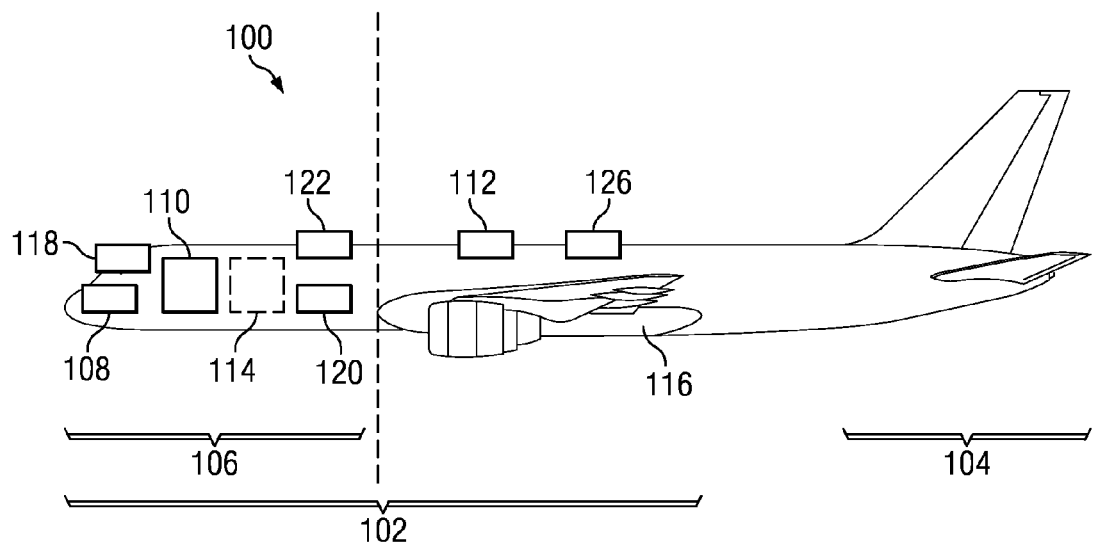
FIG. 1 is an illustration of an aircraft depicted in accordance with an advantageous embodiment.

Looking now to the figures, and with specificity to FIG. 1, an illustration of an aircraft is depicted in accordance with an advantageous embodiment. Aircraft 100 is an example of an aircraft in which advantageous embodiments may be implemented.

Aircraft 100 is made up of fuselage section 102 and tail section 104. Fuselage section 102 is the main body of aircraft 100 that contains the passengers and crew onboard aircraft 100. Fuselage section 102 also contains flight data processing system 114.

Fuselage section 102 also contains forward section 106. Forward section 106 is an area of fuselage section 102 located forward of wing 116. Forward section 106 contains cockpit 118, and flight data processing system 114.

Forward section 106 also contains airspeed sensor systems 108, 110, 112, and 120. In these examples, airspeed sensor system 108 consists of pitot-static probes, and airspeed sensor system 110 consists of angle of attack sensors. Airspeed sensor system 112 consists of light detection and ranging (LIDAR) sensors in these examples. Airspeed sensor system 120 consists of Venturi tubes in these examples.

Airspeed sensor system 110 identifies the airspeed of aircraft 100 using the angle of attack of aircraft 100, global positioning system data from global positioning system sensor 122 and inertial system data from inertial sensor system 126. The angle of attack of aircraft 100 is the angle between the longitudinal principal axis of aircraft 100 and the local air mass flow. The global positioning system data contains an altitude of aircraft 100. Inertial sensor system 126 is a plurality of Schuler-tuned inertial reference units. For example, Schuler-tuned inertial reference units may be used in commercial transport aircraft. Additionally, inertial sensor system 126 consists of laser-gyro inertial reference units.

Airspeed sensor system 110 combines the angle of attack, the global positioning data from global positioning system 122, and the inertial system data to identify a static pressure and a total pressure for the environment around aircraft 100. In some advantageous embodiments, static pressure and total pressure are identified from the angle of attack, global positioning data from global positioning system 122, and the inertial system data using a lift model. An example of a lift model is described in U.S. patent application Ser. No. 12/255, 233, status pending, published as U.S. Pat. Pub. No. 2010/ 0100260, which is incorporated herein by reference.

Airspeed sensor system 110 identifies the airspeed of aircraft 100 using pitot-static probes. Pitot-static probes identify airspeed by measuring the static pressure and the total pressure of the environment surrounding aircraft 100. The pitot-static probes consist of cantilevered tubes pointed in the direction of flight and which measure the stagnation (total) pressure of the air at the tip of the tube, and the ambient (static) pressure along the side of the tube. Alternatively the probe may measure pitot pressure only and static pressure may be measured by flush ports along the side of the forward aircraft body. Airspeed sensor system 110 identifies the static pressure and the total pressure of the environment surrounding aircraft 100.

In some advantageous embodiments, airspeed data system 112 is present and airspeed sensor system 120 is absent. However, in other advantageous embodiments, both airspeed data system 112 and airspeed sensor system 120 are present.

Airspeed sensor system 120 identifies airspeed of aircraft 100 using Venturi tubes. A Venturi tube is a pipe that has at least two sections, wherein each section has a different diameter. Air enters airspeed sensor system 120 as aircraft 100 moves through the air. The air flows into one section, and then into the other section. The air has a different pressure in each section of the pipe.

The pressure differential between the fluid in the two sections and the static pressure of the environment surrounding aircraft 100 may be identified. The static pressure may be identified at the point at which the air enters the pipe. The pressure differential may be measured by measuring pressures in both sections of the Venturi tube and subtracting the pressure in one section from the pressure in the other section. The pressure differential may be used to obtain the total pressure for the environment surrounding aircraft 100.

Airspeed data system 112 is associated with tail section 104. Airspeed data system 112 consists of light detection and ranging (LIDAR) sensors in these examples. Airspeed data system 112 uses lasers to monitor the distance traveled by aircraft 100 over a period of time. The distance and the period of time are used to identify an airspeed for aircraft 100.

Flight data system 114 receives total pressure and static pressure from airspeed sensor systems 108, 110, and 120.

Figure 2:
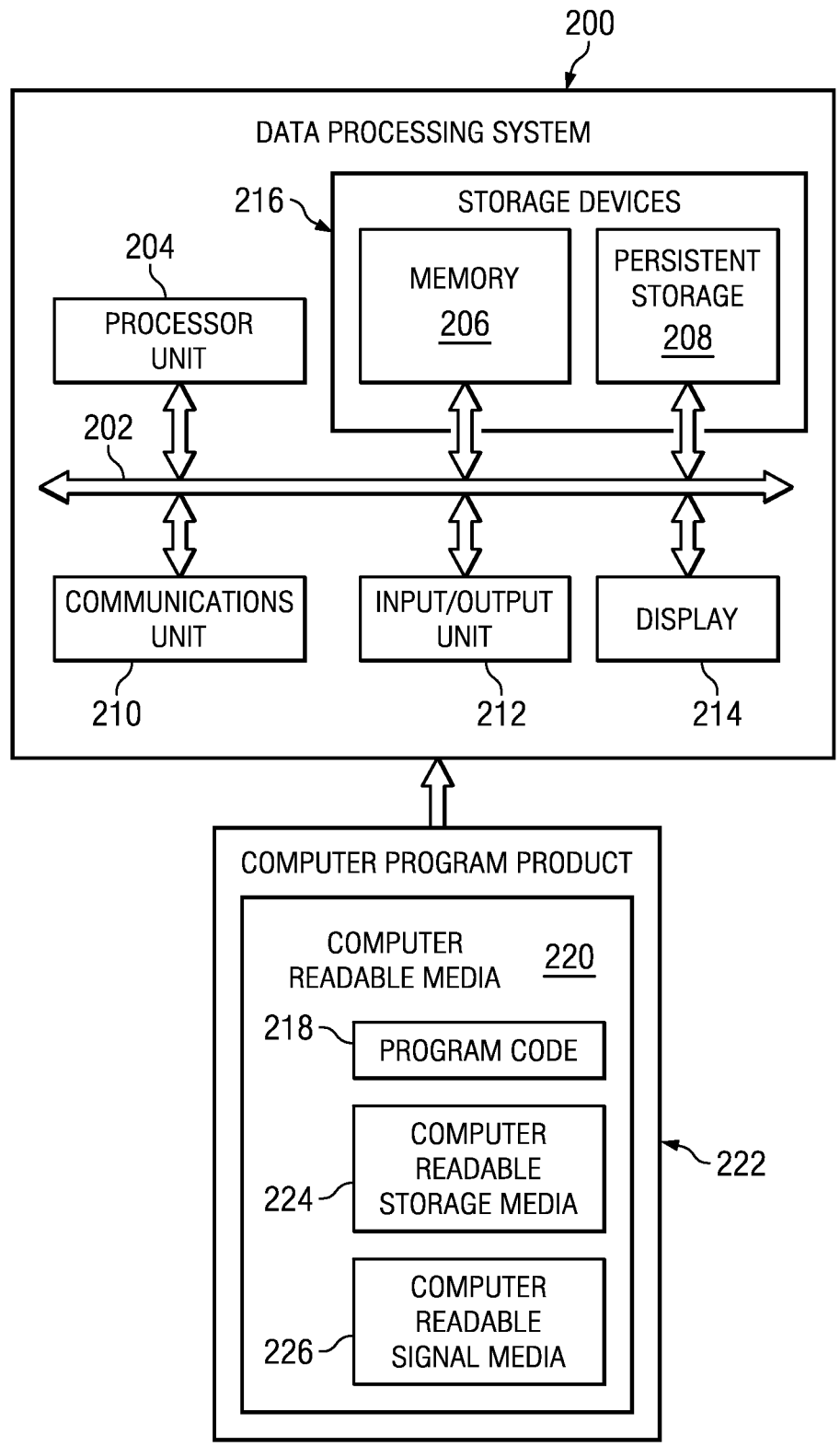
FIG. 2 is an illustration of a data processing system depicted in accordance with an advantageous embodiment.

Turning now to FIG. 2, a diagram of a data processing system is depicted in accordance with an advantageous embodiment. Data processing system 200 may be used to implement computer system 308 in FIG. 3. Data processing system 200 may be used as an aircraft data system for identifying an airspeed for an aircraft, such as aircraft 100 in FIG. 1.

In this advantageous embodiment, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another advantageous example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these advantageous embodiments, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the advantageous examples.

In some advantageous embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the advantageous examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. For example, the different advantageous embodiments recognize and take into account that a common mode event may cause inconsistent data to be reported by more than one sensor used to determine airspeed. A common mode event is an event that adversely affects more than one sensor of the same type. For example, ice accumulation may adversely affect a plurality of pitot-static probes at the same time.

The different advantageous embodiments recognize that some types of sensors are not likely to be affected by the same common mode event as other types of sensors. The sensors may not be affected by the same event due to the design of the sensors and/or the location of the sensors. For example, ice may not affect a second or third type of airspeed sensor because of the location of the airspeed sensor or the design of the sensor is not affected by ice.

Additionally, the different advantageous embodiments recognize that receiving airspeed and/or pressure data from two different sensor system types does not allow the aircraft data consolidation system receiving the airspeed and/or pressure data to identify which airspeed data sensor system type is reporting an accurate value in the event there is an inconsistency in the data received from the two sensor types.

The different advantageous embodiments recognize that receiving pressure and/or airspeed data from at least three different airspeed data sensor system types allow the aircraft data system to identify which single sensor type is reporting inconsistent values by comparing the values to the values obtained using the other two sensor types.

Thus, the different advantageous embodiments provide an apparatus and method for identifying an airspeed for an aircraft. In one advantageous embodiment, an apparatus is provided. The apparatus consists of a plurality of pitot-static probes. Each of the plurality of pitot-static probes is a first sensor type. The plurality of pitot-static probes generate first data. The apparatus also consists of a plurality of angle of attack sensor systems. Each of the plurality of angle of attack sensor systems is a second sensor type, and the plurality of angle of attack sensor systems generate second data. The apparatus also consist of a plurality of light detection and ranging sensors. The plurality of light detection and ranging sensors generate third data. The apparatus also consists of a signal consolidation system configured to detect errors in the first data generated by the plurality of pitot-static probes, the second data generated by the plurality of angle of attack sensor systems and the third data generated by the plurality of light detection and ranging sensors.

In another advantageous embodiment, an apparatus consists of a plurality of pitot-static probes, a plurality of angle of attack sensor systems, a plurality of Venturi tubes, and a signal consolidation system. Each of the plurality of pitot-static probes is a first sensor type. The plurality of pitot-static probes are configured to generate first data. Each of the plurality of angle of attack sensor systems is a second sensor type, and the plurality of angle of attack sensor systems are configured to generate second data. Each of the plurality of Venturi tubes is a third sensor type, and the plurality of Venturi tubes are configured to generate third data. The signal consolidation system is configured to detect errors in the first data generated by the plurality of pitot-static probes, the second data generated by the plurality of angle of attack sensor systems, and the third data generated by the plurality of Venturi tubes.

In yet another advantageous embodiment, a method for identifying an airspeed of an aircraft is provided. A plurality of pitot-static probes generate a first total pressure value and a first static pressure value for an environment surrounding the aircraft. A plurality of light detection and ranging sensors generate a second total pressure value and a second static pressure value for the environment surrounding the aircraft. A plurality of angle of attack sensor systems generate a third total pressure value and a third static pressure value for the environment surrounding the aircraft. The first total pressure values, the first static pressure values, the second total pressure values, the second static pressure values, the third total pressure values, and the third static pressure values are consolidated to form a consolidated total pressure value and a consolidated static pressure value. An airspeed is identified for the aircraft from the consolidated total pressure value and the consolidated static pressure value.

Figure 3:
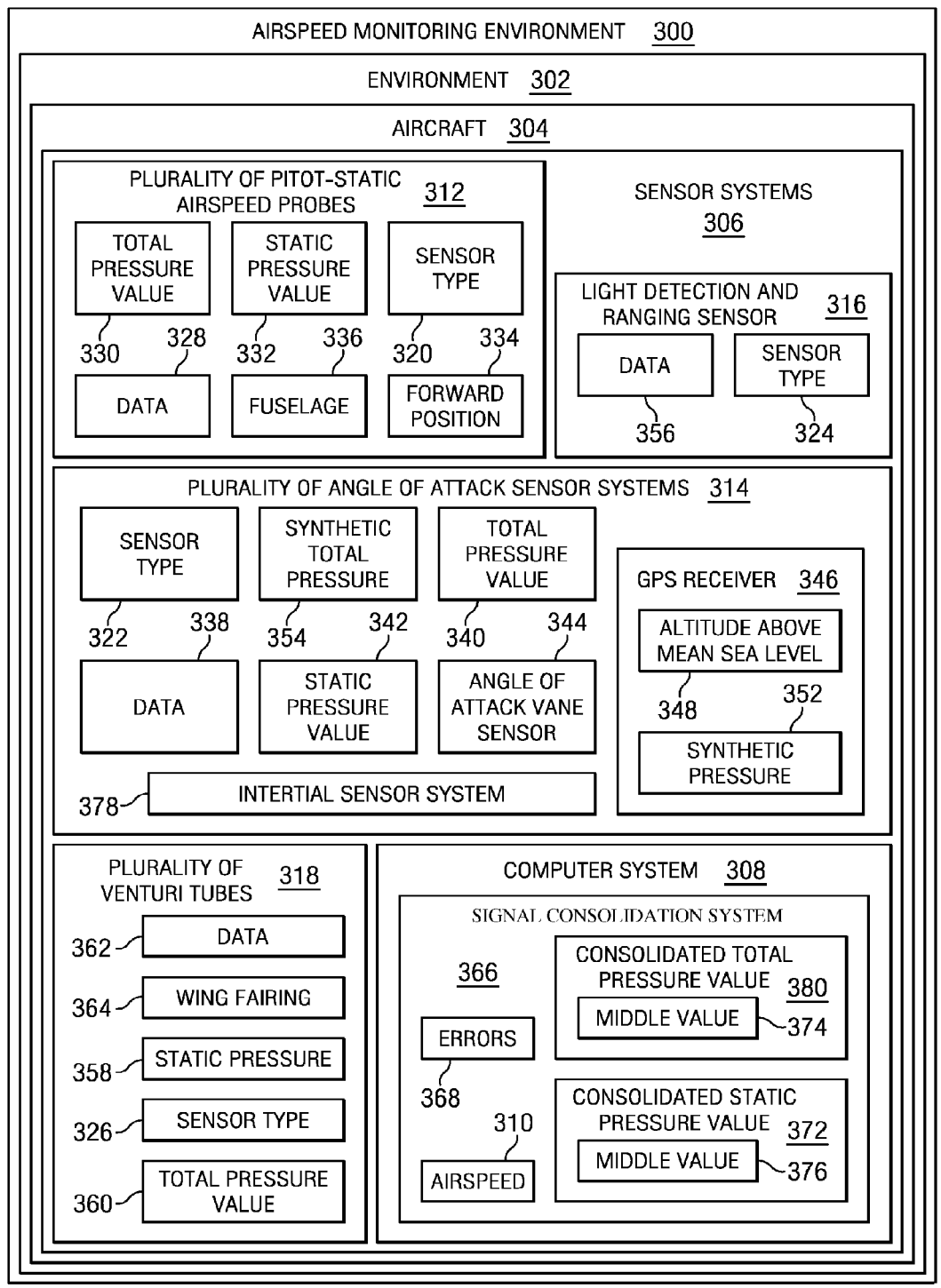
FIG. 3 is an illustration of an airspeed monitoring environment depicted in accordance with an advantageous embodiment.

Turning now to FIG. 3, an illustration of an airspeed monitoring environment is depicted in accordance with an advantageous embodiment. Airspeed monitoring environment 300 may be used to monitor the airspeed of aircraft 100 in FIG. 1.

Airspeed monitoring environment 300 contains environment 302. Environment 302 is a physical area that surrounds aircraft 304. Aircraft 100 in FIG. 1 is an example of aircraft 304. Sensor systems 306 and computer system 308 are onboard aircraft 304. In these examples, computer system 308 is located on the interior of aircraft 304 and sensor systems 306 are located on the outside of aircraft 304.

Sensor systems 306 are used by computer system 308 to identify airspeed 310 of aircraft 304. Sensor systems 306 consist of sensors of sensor types 320, 322, 324, and 326. Sensor types 320, 322, 324, and 326 are different types of sensors such that an event that may cause one sensor type to generate inconsistent data does not cause another sensor type to generate inconsistent data.

In these examples, sensor type 320 is plurality of pitot-static probes 312, sensor type 322 is plurality of angle attack sensor systems 314, sensor type 324 is plurality of light detection and ranging sensors 316, and sensor type 326 is plurality of Venturi tubes 318. It should be noted that in some advantageous embodiments, plurality of light detection and ranging sensors 316 is present and plurality of Venturi tubes 318 is absent. Likewise, in other advantageous embodiments, plurality of Venturi tubes 318 is present and plurality of light detection and ranging sensors 316 is absent.

Plurality of pitot-static probes 312 are tubes that point forward on aircraft 304 in the direction of travel. Air impinges on plurality of pitot-static probes 312 while aircraft 304 is in motion. As the speed of aircraft 304 increases, the air causes the total pressure in plurality of pitot-static probes 312 to increase. Plurality of pitot-static probes 312 generates data 328. In these examples, data 328 consists of total pressure value 330 and static pressure value 332. Total pressure value 330 is a value for the total pressure of air around aircraft 304 as a result of aircraft 304 being in motion. Static pressure value 332 is a value for the static pressure of the atmosphere in environment 302.

The static pressure and total pressure are used to identify the airspeed of aircraft 100 using Bernoulli's equation for compressible flow as follows:

$$V_c = C_{so} (5 ((P_t - P_s)/P_{so} + 1)^{2/7} - 1))^{1/2},$$

where $P_t$ is total pressure for the environment surrounding aircraft 100, $P_s$ is static pressure for the environment surrounding aircraft 100, $P_{so}$ is the standard day static pressure at sea-level, $C_{so}$ is the speed of sound at sea-level, standard day is a term used to describe a set of atmospheric data tables showing temperature, pressure and density as a function of altitude, and $V_c$ is the calibrated airspeed of aircraft 100.

Plurality of pitot-static probes 312 is located on forward portion 334 of fuselage 336. Fuselage 336 is an example implementation of fuselage portion 102 in FIG. 1.

Plurality of angle of attack sensor systems 314 measure the angle of attack of aircraft 304. Angle of attack is the angle of the longitudinal principal axis of aircraft 304 with respect to the direction of the airflow. Angle of attack sensor systems 314 generate data 338. In these examples, angle of attack sensor systems 314 generate synthetic total pressure value 340 and synthetic static pressure value 342 by using angle of attack vane sensor 344, altitude as identified by global positioning system (GPS) receiver 346, and inertial data from inertial sensor system 378. Data 338, inertial data from inertial sensor system 378, and altitude as identified by global positioning system receiver 346 are used to solve an aircraft lift model for synthetic total pressure value 340. One example of a lift model that may be solved to identify total and static pressure is as follows:

$$c_L = c_{L0} + \Delta c_{L\alpha} * a = W * n_z \div (q\_bar) * S$$

$$or\, a = \left[ W \left( \frac{n_z}{(q\_bar) * S} \right) - c_{L0} - \Delta c_L (\text{movable surfaces}) \right] \div C_{L\alpha}$$

where $C_L$ is the lift coefficient, $C_{L0}$ is the lift coefficient at angle of attack equal to zero, $\Delta C_L$ is the change in the lift coefficient caused by high-lift and movable surfaces, $C_{L\alpha}$ is the slope of the lift coefficient as a function of alpha, $\alpha$ is the angle of attack of aircraft 304, W is the gross weight of aircraft 304, $n_z$ is the load factor of aircraft 304, q_bar is the dynamic pressure, and S is the reference area of the wings of aircraft 304.

Examples of movable surfaces include elevators, horizontal stabilizers, ailerons, rudders, trim tabs, spoilers, flaps, slats, and other movable surfaces. This lift model is a simple lift model in these examples. However, in other advantageous embodiments, more complex lift models may be used. A complex lift model includes additional mathematical features than a simple lift model. For example, the complex lift model may include additional mathematical variables, operations, and functions not present in the simple lift model.

The result of the aircraft lift model is to derive total and static pressure. Identifying synthetic total pressure value 340 and synthetic static pressure value 342 by using angle of attack vane sensor 344, altitude as identified by global positioning system (GPS) receiver 346, and inertial data from inertial sensor system 378 in an example of a lift model that is described in U.S. patent application Ser. No. 12/255,233, status pending, published as U.S. Pat. Pub. No. 2010/0100260, which is incorporated herein by reference.

Global positioning system receiver 346 identifies altitude above mean sea level 348 of aircraft 304. Plurality of angle of attack sensor systems 314 uses altitude above mean sea level 348 to generate synthetic static pressure 352. Synthetic static pressure 352 is an approximation of static pressure value 342 in environment 302 at altitude above mean sea level 348. Static pressure value 342 is set to the value of synthetic static pressure 352 in these examples.

Plurality of angle of attack sensor systems 314 also generate total pressure value 340. Plurality of angle of attack sensor systems 314 use the gross weight of aircraft 304 and inertial data of aircraft 304 to generate synthetic total pressure 354. Synthetic total pressure 354 is used as total pressure value 340 in these examples.

Plurality of light detection and ranging sensors 316 (LIDAR) uses one or more lasers to generate data 356. Data 356 consists of an airspeed for aircraft 304. Light detection and ranging sensors 316 generates data 356 by using the one or more lasers to identify a distance traveled over a period of time. In some advantageous embodiments, light detection and ranging sensors 316 measure true airspeed of aircraft by measuring the doppler shift from Rayleigh backscatter from the air molecules and/or Mie backscatter from the aerosol particles in the air mass. Light detection and ranging sensors 316 also measure air ambient temperature and ambient pressure from the Rayleigh backscatter. From these data they compute the calibrated airspeed of aircraft 304 and the total and static pressures for the aircraft environment 302.

In one advantageous embodiment the light detection and ranging sensors may be pointed in a rear-looking direction. Thus, the possibility of ice and large hail contacting the light detection and ranging sensors is reduced. In other advantageous embodiments, the light detection and ranging sensors may each make multiple measurements along directions that are not aligned with the direction of travel, but from which measurements the airspeed may be calculated by identifying the multiple components of velocity into the direction of travel.

In yet other advantageous embodiments, the light detection and ranging sensors may make their airspeed measurements at a distance outside the region of local airflow disturbance caused by the aircraft itself. In other advantageous embodiments, the light detection and ranging sensors may make their measurements at a very short distance from the aircraft, within the region of local airflow disturbance. Such measurements are then corrected for the effects of the local airflow.

In some advantageous embodiments, plurality of Venturi tubes 318 is present in sensor systems 306 and plurality of light detection and ranging sensors 316 is absent. Plurality of Venturi tubes 318 is a number of pipes that each have at least two sections, wherein each section of each pipe has a different diameter. Air enters plurality of Venturi tubes 318 as aircraft 304 moves through the air. The air flows into one section, and then into the other section. The air has a different pressure in each section of the pipe.

The pressure differential between the fluid in the two sections and static pressure 358 of environment 302 surrounding aircraft 304 may be identified. Static pressure value 358 may be identified at the point at which the air enters the pipe. The pressure differential may be measured by measuring pressures in both sections of the Venturi tube and subtracting the pressure in one section from the pressure in the other section. In one advantageous embodiment, plurality of Venturi tubes 318 consist of Venturi tubes in which the center section is narrower than the inlet section, that is, a divergent/convergent tube. A smaller presure differential generated in a Venturi tube in which the center section is narrower than the inlet section has the advantage that it operates successfully at high subsonic Mach numbers and may be used at substantially all subsonic speeds.

Total pressure value 360 is generated for environment 302 surrounding aircraft 304. Plurality of Venturi tubes 318 generates data 362. Data 362 is static pressure value 358 and total pressure 360 in these examples. In some advantageous embodiments, plurality of Venturi tubes 318 are located forward on fuselage 336 of wing fairing 364.

Computer system 308 then runs signal consolidation system 366. Signal consolidation system 366 detects errors 368 in data 328, data 338, data 356, and/or data 362 by generating consolidated total pressure value 370 and consolidated static pressure value 372. Errors may be present in data 328, data 338, data 356, and/or data 362 because one or more events have caused one or more sensor systems 306 to generate inconsistent data.

For example, ice may accumulate in the inlets of plurality of pitot-static probes 312 and plurality of pitot-static probes 312 may generate inconsistencies in total pressure value 330 and/or static pressure value 332.

Signal consolidation system 366 detects and isolates errors 368 by generating consolidated total pressure value 380 and consolidated static pressure value 372. Consolidated static pressure value 372 is a value generated from some or all of static pressure values 332, 342, and 358. In these examples, consolidated static pressure value 372 is middle value 376 from static pressure values 332, 342, and 358.

Likewise, consolidated total pressure value 380 is a value generated from some or all of total pressure value 332, total pressure value 340, and total pressure value 360. In these examples, consolidated total pressure value 380 is middle value 374 from total pressure values 332, 340, and 360.

Once consolidated total pressure value 380 and consolidated static pressure value 372 are generated, signal consolidation system 366 generates airspeed 310. In these examples, airspeed 310 is calibrated airspeed of aircraft 304.

In advantageous embodiments in which plurality of light detection and ranging sensors 316 is present, airspeed generated by plurality of light detection and ranging sensors 316 is compared with airspeed 310. If the airspeed generated by light detection and ranging sensor 316 differs from airspeed 310 by more than a specified amount, the value for airspeed 310 may be modified. For example, airspeed 310 may be modified to the midpoint between the airspeed generated by plurality of light detection and ranging sensors 316.

The illustration of airspeed monitoring environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, plurality of Venturi tubes 318 are absent. In other advantageous embodiments, plurality of light detection and ranging sensors 316 is absent. In some advantageous embodiments, plurality of Venturi tubes 318 are located on the vertical stabilizer of aircraft 304.

Figure 4:
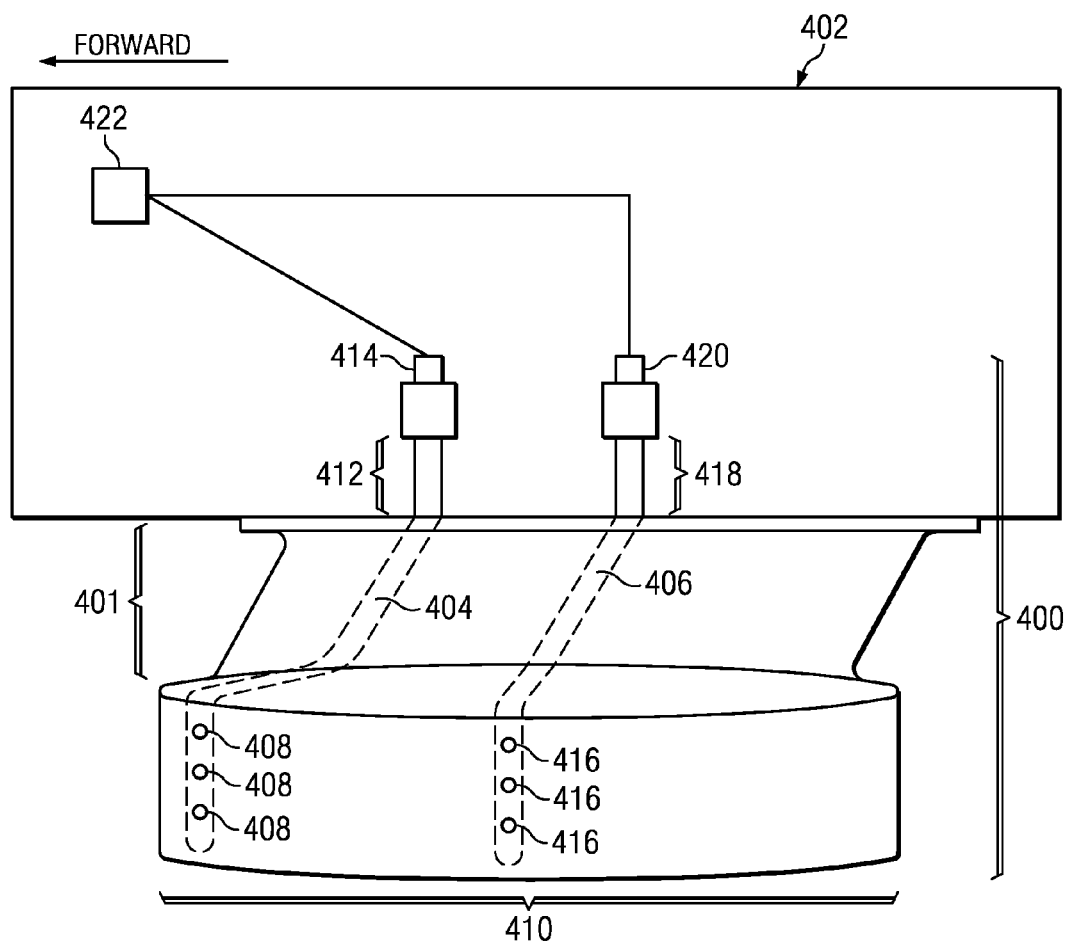
FIG. 4 is an illustration of a Venturi tube depicted in accordance with an advantageous embodiment.

Looking now to FIG. 4, an illustration of a Venturi tube is depicted in accordance with an advantageous embodiment. Venturi tube 400 is an example of a Venturi tube in plurality of Venturi tubes 318.

Venturi tube 400 extends from fuselage 402 in this advantageous embodiment. Fuselage 402 is an example implementation of fuselage 336 in FIG. 3. Arrow 403 indicates the forward direction on fuselage 402. The forward direction indicated by arrow 403 is the direction in which the cockpit is located in this advantageous embodiment. Of course, in other advantageous embodiments, Venturi tube 400 may be located in other suitable locations.

Venturi tube 400 consists of tube 404 and tube 406. Tube 404 and 406 extend from fuselage 402 through strut 401. Ports 408 in tube 404 allows air traveling in region 410 to enter tube 404. Air travels through tube 404 to connector 412. The air traveling through tube 404 travels through connector 412. Connector 412 connects tube 404 to sensor 414. The pressure of the air in tube 404 is measured using sensor 414. Sensor 414 is attached to connector 412 in this advantageous embodiment. Of course, sensor 414 may be connected to connector 412 using a tube, a channel, or other suitable device.

Likewise, ports 416 allow air traveling in region 410 to enter tube 406. Tube 406 is like tube 404, but is a different diameter than tube 404. In this advantageous embodiment, tube 406 is twice the diameter of tube 404. Thus, Venturi tube 400 is a divergent/convergent Venturi tube.

The air traveling through tube 406 travels through connector 418. Connector 418 connects tube 406 to sensor 420. The pressure of the air in tube 406 is measured using sensor 420. Sensor 420 is attached to connector 418 in this advantageous embodiment. Of course, sensor 414 may be connected to connector 412 using a tube, a channel, or another suitable device.

Computer system 422 is an example implementation of computer system 308 in FIG. 3. Computer system 422 receives the pressure values from sensor 414 and sensor 420. Computer system 422 then calculates the difference between the pressure values. The difference between the pressure values is used by computer system 422 to generate a total pressure value, such as total pressure value 360 in FIG. 3, for the environment in region 410.

In some advantageous embodiments, one or more static pressure sensors may also be present. For example, a static pressure sensor may be located substantially adjacent to ports 408 and/or ports 416. The static pressure values generated by static pressure sensors are sent to computer system 422 in such advantageous embodiments.

Figures 5, 6, 7:
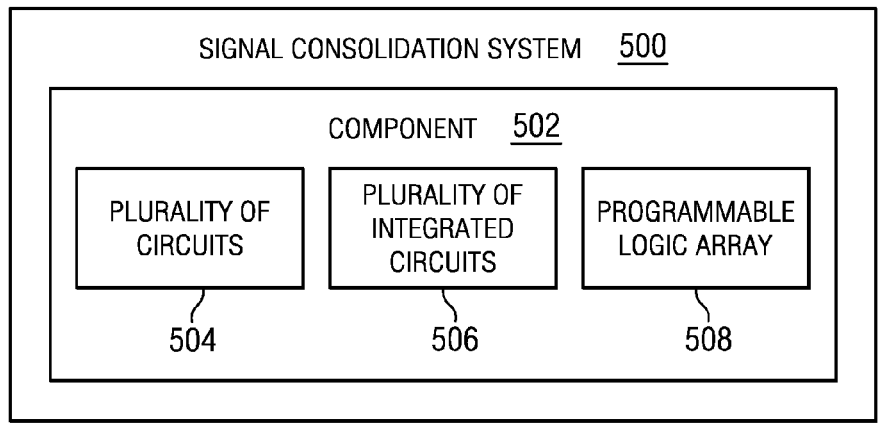
FIG. 5 is an illustration of a signal consolidation system depicted in accordance with an advantageous embodiment.
FIG. 6 is an illustration of total pressure values depicted in accordance with an advantageous embodiment.
FIG. 7 is a second illustration of total pressure values depicted in accordance with an advantageous embodiment.

Turning now to FIG. 5, an illustration of a signal consolidation system is depicted in accordance with an advantageous embodiment. Signal consolidation system 500 is an example implementation of signal consolidation system 366 in FIG. 3.

Signal consolidation system 366 is implemented as a process in computer system 308 in FIG. 3. However, signal consolidation system 500 may instead be implemented using one or more of component 502. Component 502 may be plurality of circuits 504, plurality of integrated circuits 506, and programmable logic array 508.

FIGS. 6-7 illustrate an example of a signal consolidation system generating a consolidated total pressure value using total pressure values from sensor systems on an aircraft. Of course, consolidated static pressure may be generated in a similar manner as consolidated total pressure.

Turning now to FIG. 6, an illustration of total pressure values is depicted in accordance with an advantageous embodiment. Total pressure values 600 are example implementations of total pressure values 332, 340, and 360 in FIG. 3.

Total pressure values 600 are shown after being generated by sensor systems, such as sensor systems 306 in FIG. 3. Sensor column 602 indicates the identity of the sensor that generated the value in total pressure column 604. In this illustrative example, pitot-static sensors 606 generated values of about 26 and about 23. Likewise, angle of attack sensor systems 608 generated values of about 24 and about 22. Venturi tubes 610 generated values of about 14 and about 11.

A signal consolidation system, such as signal consolidation system 366 in FIG. 3 processes total pressure values 600. Assume the consolidated total pressure value last generated by the signal consolidation system was about 24. For each sensor type, the middle value among the two generated values and the last consolidated total pressure value is selected.

In this example, the middle value for pitot-static sensors 606 between 26, 23, and the last consolidated total pressure value of 24 is selected to form 24. Likewise, the middle value among the two generated values for angle of attack sensors 608 and the last consolidated total pressure value of 24 is selected to form 24. Additionally, the middle value among the two generated values for Venturi tubes 610 and the last consolidated total pressure value of 24 is selected to form 14.

Looking now to FIG. 7, a second illustration of total pressure values is depicted in accordance with an advantageous embodiment. Total pressure values 700 are being consolidated and are generated from total pressure values 600 in FIG. 6.

Total pressure values 700 contains total pressure for pitot-static system 702 of 24, total pressure for angle of attack system 704 of 24, and total pressure for Venturi tubes 706 of 14. The signal consolidation system generates consolidated total pressure using total pressure values 700. The signal consolidation system may generate the consolidated total pressure by selecting the middle value from the three values. In this illustrative example, the value of 24 is selected because the highest value is 24 and the lowest value is 14. The remaining value to be selected as the middle value is 24. Thus, the signal consolidation system generates 24 as the consolidated total pressure for the aircraft.

In this example, Venturi tubes 706 generated a value that was ten units away from the other sensor types. The signal consolidation system may identify Venturi tubes 706 as generating inconsistent data. In some advantageous embodiments, the signal consolidation system may create a diagnostic log entry that Venturi tubes 706 generated a total pressure value that differed from the consolidated total pressure value by more than a threshold amount or percent.

Figure 8:
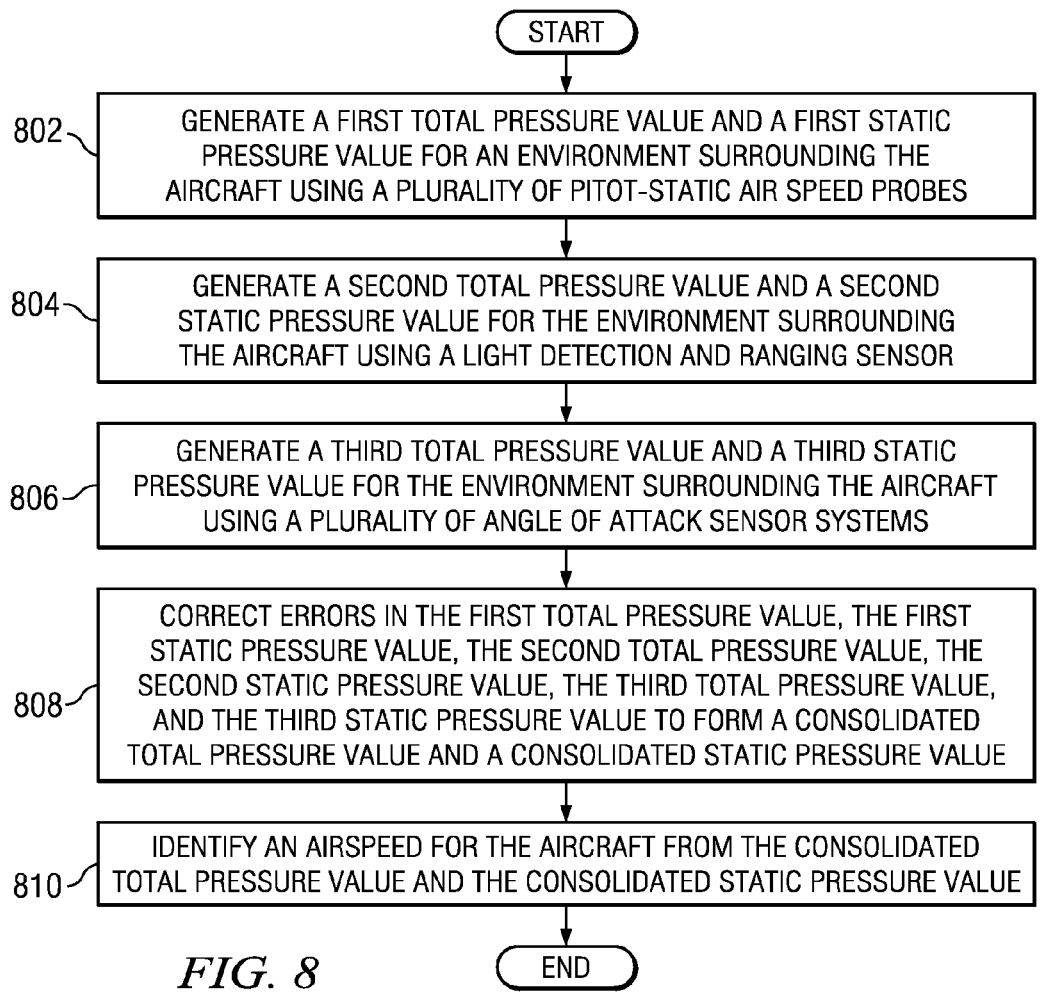
FIG. 8 is an illustration of a flowchart of a process for identifying an airspeed of an aircraft depicted in accordance with an advantageous embodiment.

Turning now to FIG. 8, an illustration of a flowchart of a process for identifying an airspeed of an aircraft is depicted in accordance with an advantageous embodiment. The process may be performed by signal consolidation system 366 running on computer system 308 in FIG. 3. The process may also be performed by component 502 in FIG. 5.

The process begins by generating, by a plurality of pitot-static probes, a first total pressure value and a first static pressure value for an environment surrounding the aircraft (operation 802). The process then generates a second total pressure value and a second static pressure value for the environment surrounding the aircraft using a plurality of light detection and ranging sensors (operation 804). The process then generates a third total pressure value and a third static pressure value for the environment surrounding the aircraft using a plurality of angle of attack sensor systems (operation 806).

The process then detects errors in the first total pressure value, the first static pressure value, the second total pressure value, the second static pressure value, the third total pressure value, and the third static pressure value to form a consolidated total pressure value and a consolidated static pressure value (operation 808). The process detects errors by selecting the middle value from the last consolidated static or total pressure value and each of the sensors of a particular type. The process then generates a consolidated static or total pressure value by taking the middle value of the remaining values.

Next, the process identifies an airspeed for the aircraft from the consolidated total pressure value and the consolidated static pressure value (operation 810). The process may identify the airspeed for the aircraft using the following formula based on Bernoulli's principle:

$$V_c = C_{so} (5 ((P_t - P_s)/P_{so} + 1)^{2/7} - 1))^{1/2},$$

where $V_c$ is the calibrated airspeed of the aircraft, $P_t$ is total pressure for the environment surrounding the aircraft, $P_s$ is static pressure for the environment surrounding the aircraft, $P_{so}$ is the standard day static pressure at sea-level, $C_{so}$ is the speed of sound at sea-level, standard day, and $V_c$ is the calibrated airspeed of aircraft 100. The process terminates thereafter.

Figure 9:
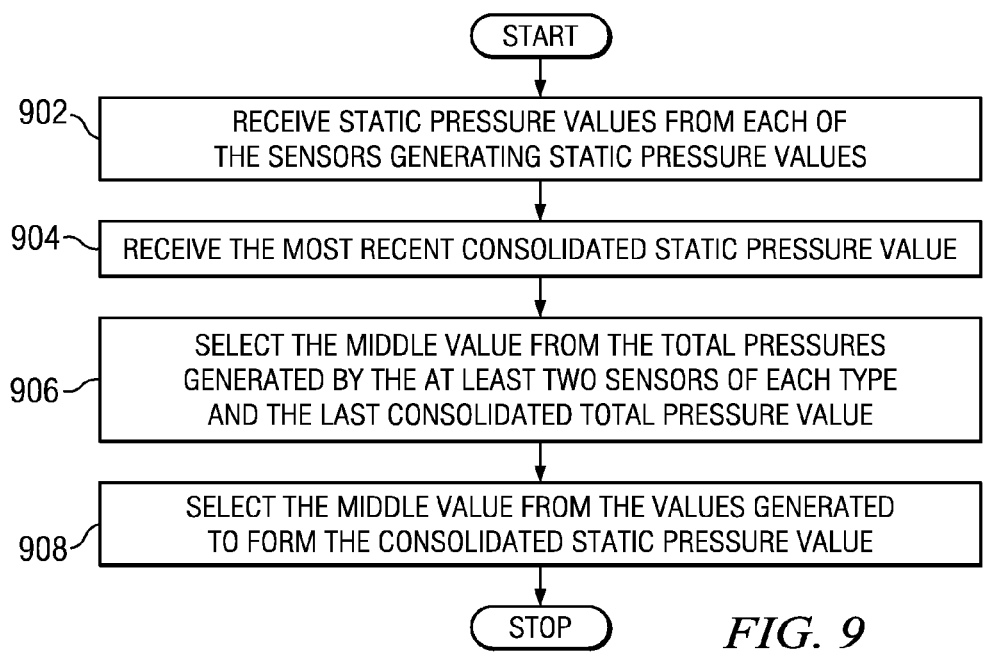
FIG. 9 a flowchart of a process for detecting errors depicted in accordance with an advantageous embodiment.

Looking now to FIG. 9, a flowchart of [[a]] an error correction process for detecting errors is depicted in accordance with an advantageous embodiment. The process may be performed by signal consolidation system 366 by computer system 308 in FIG. 3. The process may also be performed by component 502 in FIG. 5.

The process begins by receiving static pressure values from each of the sensors generating static pressure values and total pressure values from each of the sensors generating total pressure values (operation 902). In these examples, the aircraft has at least three different sensor types and at least two of each type of sensor. The process then receives the most recent consolidated static pressure value (operation 904). In some advantageous embodiments, the most recent consolidated static pressure value is a value generated during operation 908 in a previous performance of the process in FIG. 9. Of course, if such a value is absent, a default value may be used.

The process then selects, for each sensor type, the middle value from the static pressure values generated by the at least two sensors of each type received in operation 904 and the last consolidated total pressure value received in operation 906 (operation 906). The process then selects the middle value from the values generated during operation 906 to form the consolidated static pressure value (operation 908). The process terminates thereafter.

The flowcharts and illustrations in the different depicted embodiments illustrate the architecture, functionality, and operation of some possible implementations of apparatus and methods in different advantageous embodiments. In this regard, each block in the flowchart or illustrations may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, the process may generate values for the total pressure at operations 902-908 instead of the static pressure. Additionally, the process may store a report after operation 908 in the event that a sensor type is generating inconsistent data and/or data that differs from the values generated by the other sensor types by more than a particular amount or percent.

Additionally, the process may use airspeed values to detect errors instead of static pressure values in FIG. 9. More specifically, the process may generate a consolidated airspeed value at operations 902-908 instead of static pressure.

In such advantageous embodiments, the process may receive airspeed values instead of static pressure values at operation 902. The proces may then receive the most recent airspeed value at operation 904 instead of the most recent static pressure value. Likewise, the process may select, for each sensor type, the middle value from the airspeed values received and the most recent airspeed value at operation 906. Finally, the process may select the middle value from the values generated in operation 906 to form a consolidated airspeed value at operation 908.

Thus, the different advantageous embodiments provide an apparatus and method for identifying an airspeed for an aircraft. In one advantageous embodiment, an apparatus is provided. The apparatus consists of a plurality of pitot-static probes. Each of the plurality of pitot-static probes is a first sensor type. The plurality of pitot-static probes generate first data. The apparatus also consists of a plurality of angle of attack sensor systems. Each of the plurality of angle of attack sensor systems is a second sensor type, and the plurality of angle of attack sensor systems generate second data. The apparatus also consist of a plurality of light detection and ranging sensors. The light detection and ranging sensors generate third data. The apparatus also consists of a signal consolidation system configured to correct errors in the first data generated by the plurality of pitot-static probes, the second data generated by the plurality of angle of attack sensor systems and the third data generated by the plurality of light detection and ranging sensors.

Thus, the different advantageous embodiments allow aircraft data systems and pilots to receive values for airspeed where inconsistency in the values is limited to acceptable values, even when a particular type of sensor is affected by an event, such as ice, that causes all the sensors of one type to generate inconsistent values. The aircraft data systems may exclude data from that sensor type and report that the sensor type is in need of maintenance or is not to be used until maintenance occurs.

Because at least three sensor types generate total and static pressure values, airspeed may be identified for the aircraft, even when all the sensors of one sensor type are generating inconsistent data. Additionally, airspeed may be identified for the aircraft, even when all of the sensors of two sensor types are generating inconsistent data because each sensor type is not affected by a particular common mode event. Additionally, the sensor type that generates the inconsistent data may be identified because two other sensor types generate consistent data and may be used to identify the airspeed of the aircraft.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of pitot-static probes, wherein each of the plurality of pitot-static probes is a first sensor type, and wherein the plurality of pitot-static probes is configured to generate first data, and further wherein the first data comprises a first total pressure value and a first static pressure value for an environment surrounding an aircraft;
a plurality of angle of attack sensor systems, wherein each of the plurality of angle of attack sensor systems is a second sensor type, and wherein the plurality of angle of attack sensor systems are configured to generate second data, and further wherein the second data comprises a second total pressure value and a second static pressure value for the environment surrounding the aircraft;
a plurality of light detection and ranging sensors, wherein each of the light detection and ranging sensors are a third sensor type, and wherein the plurality of light detection and ranging sensors are configured to generate third data, and further wherein the third data comprises a third total pressure value and a third static pressure value for the environment surrounding the aircraft; and
a signal consolidation system configured to detect errors in the first data generated by the plurality of pitot-static probes, the second data generated by the plurality of angle of attack sensor systems, and the third data generated by the plurality of light detection and ranging sensor systems.

2. The apparatus of claim 1, wherein the signal consolidation system comprises:
a processing unit configured to consolidate the first data, the second data, and the third data.

3. The apparatus of claim 1, wherein the signal consolidation system comprises a component selected from a plurality of circuits, a plurality of integrated circuits, and a programmable logic array.

4. The apparatus of claim 1, wherein in detecting the errors in the first data generated by the plurality of pitot-static probes, the second data generated by the plurality of angle of attack sensor systems, and the third data generated by the plurality of light detection and ranging sensors, the signal consolidation system is configured to identify a fourth total pressure value for the environment using the first total pressure value, the second total pressure value, and the third total pressure value; and identify a fourth static pressure value for the environment surrounding the aircraft using the first static pressure value, the second static pressure value, and the third static pressure value.

5. The apparatus of claim 4, wherein in identifying the fourth total pressure value for the environment using the first total pressure value, the second total pressure value, and the third total pressure value, the signal consolidation system is configured to identify a first middle value from the first total pressure value, the second total pressure value, and the third total pressure value to form a consolidated total pressure value for the environment.

6. The apparatus of claim 5, wherein in identifying the fourth static pressure value for the environment using the first static pressure value, the second static pressure value, and the third static pressure value, the signal consolidation system is configured to identify a second middle value from the first static pressure value, the second static pressure value, and the third static pressure value to form a consolidated static pressure value for the environment.

7. The apparatus of claim 6, wherein the signal consolidation system is further configured to identify an airspeed for the aircraft from the first middle value and the second middle value.

8. The apparatus of claim 1, wherein each of the plurality of angle of attack sensor systems comprises:
an angle of attack vane sensor associated with a forward fuselage of the aircraft;
an inertial sensor system configured to generate inertial data for the aircraft;
a global positioning system receiver configured to generate an altitude above a mean sea level for the aircraft and a synthetic static pressure value using a lift model and the inertial data.

9. An apparatus comprising:
a plurality of pitot-static probes, wherein each of the plurality of pitot-static probes is a first sensor type, and wherein the plurality of pitot-static probes are configured to generate first data such that the first data comprises a first total pressure value and a first static pressure value for an environment surrounding an aircraft;
a plurality of angle of attack sensor systems, wherein each of the plurality of angle of attack sensor systems is a second sensor type, and wherein the plurality of angle of attack sensor systems are configured to generate second data such that the second data comprises a second total pressure value and a second static pressure value for the environment surrounding the aircraft;
a plurality of Venturi tubes, wherein each of the plurality of Venturi tubes is a third sensor type, and wherein the plurality of Venturi tubes are configured to generate third data such that the third data comprises a third total pressure value and a third static pressure value for the environment surrounding the aircraft; and
a signal consolidation system configured to detect errors in the first data generated by the plurality of pitot-static probes, the second data generated by the plurality of angle of attack sensor systems, and the third data generated by the plurality of Venturi tubes.

10. The apparatus of claim 9, wherein the signal consolidation system comprises a computer readable storage medium, and computer readable program code, stored on a non-transitory computer readable storage medium, for detecting the errors in the first data, the second data, and the third data.

11. The apparatus of claim 9 further comprising:
a processing unit configured to run a computer readable program code stored on a non-transitory computer readable storage medium.

12. The apparatus of claim 9, wherein in being configured to correct errors in the first data generated by the plurality of pitot-static probes, the second data generated by the plurality of angle of attack sensor systems, and the third data generated by the plurality of Venturi tubes, the signal consolidation system is configured to identify a fourth total pressure value for the environment using the first total pressure value, the second total pressure value, and the third total pressure value; and identify a fourth static pressure value for the environment surrounding the aircraft using the first static pressure value, the second static pressure value, and the third static pressure value.

13. The apparatus of claim 12, wherein in identifying the fourth total pressure value for the environment using the first total pressure value, the second total pressure value, and the third total pressure value, the signal consolidation system is configured to identify a first middle value from the first total pressure value, the second total pressure value, and the third total pressure value to form a consolidated total pressure value for the environment.

14. The apparatus of claim 13, wherein in being configured to identify the fourth static pressure value for the environment using the first static pressure value, the second static pressure value, and the third static pressure value, the signal consolidation system is configured to identify a second middle value from the first static pressure value, the second static pressure value, and the third static pressure value to form a consolidated static pressure value for the environment.

15. The apparatus of claim 14, wherein the signal consolidation system is further configured to identify an airspeed for the aircraft from the first middle value and the second middle value.

16. A method for identifying an airspeed for an aircraft, the method comprising:

generating, using a signal consolidation system receiving input from a plurality of pitot-static probes, a first total pressure value and a first static pressure value for an environment surrounding the aircraft;

generating, using the signal consolidation system receiving input from a plurality of light detection and ranging sensors, a second total pressure value and a second static pressure value for the environment surrounding the aircraft;

generating, using the signal consolidation system receiving input from a plurality of angle of attack sensor systems, a third total pressure value and a third static pressure value for the environment surrounding the aircraft;

detecting, using the signal consolidation system receiving errors in the first total pressure value, the first static pressure value, the second total pressure value, the second static pressure value, the third total pressure value, and the third static pressure value to form a consolidated total pressure value and a consolidated static pressure value; and identifying, using a computer system implementing the signal consolidation system, the airspeed for the aircraft from the consolidated total pressure value and the consolidated static pressure value.

* * * * *